United States Patent [19]

Lugstenmann, deceased et al.

[11] 4,166,011

[45] Aug. 28, 1979

[54] METHOD FOR THE MANUFACTURE OF A SHAPING MASK FOR AN ELECTROEROSION TOOL

[75] Inventors: Curt A. Lugstenmann, deceased, late of Caslano, Switzerland; Franziska S. Capdevilla nee Lugstenmann, heir, Bern, Switzerland

[73] Assignee: Supla Etablissement, Vaduz, Liechtenstein

[21] Appl. No.: 778,128

[22] Filed: Mar. 16, 1977

[30] Foreign Application Priority Data

Mar. 18, 1976 [DE] Fed. Rep. of Germany ....... 2611425

[51] Int. Cl.² .................... C25D 1/10; C25D 1/20; C25D 1/22
[52] U.S. Cl. ............................................ 204/4; 204/6
[58] Field of Search ........................ 204/3, 4, 6, 281

[56] References Cited

U.S. PATENT DOCUMENTS

| | | | |
|---|---|---|---|
| 2,879,209 | 3/1959 | Fialkoff | 204/281 |
| 3,230,163 | 1/1966 | Dreyfus | 204/281 |
| 3,574,075 | 4/1971 | Eccles | 204/6 |
| 3,689,729 | 9/1972 | Neward | 204/3 |

Primary Examiner—T. M. Tufariello
Attorney, Agent, or Firm—Karl F. Ross

[57] ABSTRACT

A method of making a shaping mask from copper or copper alloy for electrical machining tools which comprises applying to a steel matrix or form, a thin conductive coating of a neutral material, especially a hard chromium, passivating this layer and applying into the copper or copper alloy the galvanic deposition until the electro deposited layer lifts autogenously from the layer intact.

3 Claims, No Drawings

METHOD FOR THE MANUFACTURE OF A SHAPING MASK FOR AN ELECTROEROSION TOOL

FIELD OF THE INVENTION

The invention relates to a method for the manufacture of a shaping mask for an electroerosion tool, said shaping mask corresponding to a matrix and consisting of copper or copper alloy,—whereby a mold having a surface corresponding to the shaping mask is provided with a conductive layer on the surface of which a metal layer of copper or copper alloy is galvanically built up and the metal layer is lifted from the mold as a shaping mask.—Shaping mask here designates the shape-defining tool component of an electroerosion tool which is connected to a mechanical support or carrier.

BACKGROUND OF THE INVENTION

In known methods of this kind (DT-OS 16 90577) the mold is an auxiliary element formed according to the matrix and is, for example, of artificial material, wax or an easily fusible alloy. One thus works with a reproduction of the matrix which necessarily results in inaccuracies. Therefore, the shaping mask obtained by the means of the auxiliary elements does not satisfy requirements for high. This applies also and particularly when, in addition, (DT-OS 19 12312) conductive lacquer and/or separating lacquer is used. On the other hand, modern tool manufacture sets increasingly high standards on precision, particularly with respect to precision-machining tools. These demands can no longer be met using the conventional methods. Consequently, electroerosion tools meeting the precision requirements can no longer be produced by hitherto known methods and therefore can no longer simply be reproduced.

OBJECT OF THE INVENTION

The object of the invention is to find a method for the manufacture of a shaping mask corresponding to the matrix for an electroerosion tool by which high-precision shaping masks having practically zero tolerance can be produced.

SUMMARY OF THE INVENTION

According to the invention the matrix itself can be used as a mold and is directly provided with a thin coating layer galvanically applied to it as a conductive layer, the coating layer having a compact surface and consisting of a neutral metal with respect to the material of which the shaping mask is to be formed. The coating layer is then cleansed and the metal layer for the shaping mask being built-up thereon until said metal layer can be lifted as a shaping mask. The term "neutral metal" designates in the scope of the invention all metals which, although they form a coating layer on the material of the matrix, do not react chemically and/or physically in such a way as to cause a chemical or physical amalgamation between this coating layer and the metal layer of which the shaping mask is produced. A chemical and/or physical amalgamation between the shaping mask and the coating layer preventing the shaping mask from being removed. In the scope of the invention, neutral metals are particularly the ones that do not form an alloy or an intermetallic amalgamation with the material of the shaping mask to be produced, at least not upon depositing on the material of the matrix. Suitable metals are easily found by testing. The desired high precision can be attained because, according to the method of the invention, there is no need to first reproduce a matrix which already would condition an inaccuracy. On the contrary, the matrix itself is used as the mold, whereby the matrix is not subject to any change by elastic deformation or other forces in the scope of this use. The coating layer to be provided onto the matrix can be extremely thinly applied and is extremely thin, as expressed by the term "coating layer". A preferred method of the invention in this connection is characterized by the fact that a coating layer having a layer thickness of the order of magnitude of one-thousandth of a millimeter and less is being applied onto the matrix. This means, in other words, that a tolerance of the same order of magnitude can be indicated and safely maintained for the tool manufacture. A metal layer having a layer thickness of the order of magnitude of one-tenth of a millimeter to one millimeter can then be applied onto the coating layer for the shaping mask, whereby the layer thickness of the shaping mask is so selected that the shaping mask, upon removal from the matrix and thereafter, can absorb all mechanical stresses without and permanent deformation. It is understood that the shaping mask has to be carefully handled when removing it from the matrix. A careful lifting of the shaping mask from the matrix is usually achieved by extraction, whereby the shaping mask is connected to an extraction or lifting device by means of a synthetic-resin adhesive. This allows a lifting or extraction with minimum surface use.

A particularly successful method, according to the invention, is characterized by the fact that a chromium layer, preferably a hard-chromium layer (if possible with a high degree of hardness, for example, of 70 $R_C$ and higher) is applied as a coating layer onto the matrix. Surprisingly, and particularly with the method using the hard-chrome layer, it is possible to produce without any difficulty a removable shaping mask when the metal layer for the shaping mask is galvanically built-up onto the coating layer, thus particularly the hard-chromium layer, with a coating duration lasting from hours to days, and when in doing so that bath voltage of the copper bath or copper alloy bath is, to begin with, of the order of magnitude of one-tenth of a volt and less and increased up to one to several volts. In the scope of this general indication the rates can be so selected that the formation of either pulverized copper precipitation or clods or singular structures can be avoided during build-up of the copper or copper alloy layer for the shaping mask. Of course, the bath agitation and the bath temperature have to be adapted to the circumstances. Overlapping and undercutting are to be avoided during build-up of the coating layer, thus particularly the hard-chromium layer, as well as during build-up of the shaping mask. The usual bath current should always be directed, if possible, perpendicularly to the shape-defining surface of the matrix.

EXAMPLE OF OPERATION

In the case of a shaping mask to be produced for an electroerosion tool which, for its part, serves to manufacture injection-molding dies for the production of precision-machining construction elements produced by injection molding, as usual to begin with, a so-called original matrix is manufactured with optimum precision, for example by engraving. The same may consist of steel.

The matrix is to be used immediately as the mold for the production of the shaping mask. For this purpose, according to the present example, the matrix will be coated, entirely or solely on the shaping surface, in the usual way with a thin, preferably extremely thin hard-chromium layer having a thickness of the order of magnitude of one-thousandth of a millimeter and that, if possible, with a hard-chromium layer having a high degree of hardness according to Rcokwell C scale. This can be done according to Dettner/Elze "Handbuch der Galvanotechnik" (1966), Vol. II, 17.05 chromium. The hard-chromium plating is usually carried out in such a way that a smooth and compact surface is formed. Polishing of the hard-chromium-plated surface is unnecessary. Nevertheless, in addition and after the hard-chromium plating has taken place, a passivation treatment by, for example, wetting or rinsing with a bichromate solution can be useful. In any event, the thin to extremely thin hard-chromium-plated surface of the matrix is cleansed by rinsing as is customary in electroplating in preparation for further galvanic process steps. Before the next machining all drops, air bubbles and the like have to be removed from the surface.

To now galvanically build-up the shaping mask, a galvanic copper bath is prepared, for example, as described in the literature Dettner/Elze 1. c., 17.02 copper. It can be a copper bath of pyrophosphate. One always works with extremely pure copper as is also the case, for example, in the manufacture of printed circuits. The matrix itself is suspended in the copper bath as an electrode. Moreover, the electrodes of the copper bath are connected to a precision rectifier. The copper bath indicated has a bath temperature of 61° C. and is kept constant at this temperature by corresponding installations for the regulation of the bath temperature. The copper bath itself is usually agitated or pumped, if necessary by means of a group of filters. Overlappings and intersections are to be avoided and the hard-chromium shape-defining surface of the matrix is advantageously orthogonally struck by the current of the copper bath.

After that the build-up of the shaping mask beings and that, to begin with, by applying an extremely low direct voltage to the electrodes, said voltage being of the order of magnitude of 0.1 volt or even lower. This galvanic treatment is carried out until a first filmy and thin copper deposit on the hard-chromium-plated mold surface of the matrix can be detected by the naked eye, for this, a duration of generally one to several hours is necessary. Now the bath voltage can be gradually increased from one to several hours up to 0.5 volt. After further hours it can be increased to 1 volt. After that a further gradual increase can take place until, at the end of the treatment duration of approximately 24 hours, the bath voltage reaches 5 volts. By this time the shaping mask, in the form of a copper layer having a thickness ranging from tenths of millimeters to millimeters and able to absorb all mechanical stresses, has not only been built-up on the hard-chromium layer but surprisingly the so-produced shaping mask has sufficiently detached itself from the hard-chromium layer as to permit its removal by means of a synthetic resin sticker or soft plummet. Adapted die and synthetic-resin sticker are used in order to avoid, on removal, deformations caused by singular applications. The so-produced shaping mask has with respect to its own die surface, even for the equally filmy-hard-chromium coating layer deposited on the matrix, the identical shape of the matrix and thereby a precision of practically zero tolerance. The shaping mask is customarily combined with a support carrier.

We claim:

1. A method of making a shaping mask for use as an electroerosion tool, comprising the steps of:
    applying to a matrix having a shape corresponding to that of the tool to be produced, a hard-chromium layer by galvanic deposition;
    passivating said layer by treating it with a passivating solution;
    immersing the matrix carrying the galvanically deposited passivating hard-chromium layer in an electroplating bath;
    electrodepositing copper or copper alloy from said bath on said layer for a period and at a rate causing the electrodeposited copper or copper alloy to lift by itself from said layer; and
    removing the electrodeposited copper or copper alloy body after it has lifted by itself from said layer for use as said mask.

2. The method defined in claim 1 wherein said layer is built up to a thickness of the order of one-thousandth of a millimeter and the copper or copper alloy body is built up to a thickness of one-tenth of a millimeter to a millimeter, said hard chromium layer having a Rockwell C hardness value of at least 70, the treatment of the layer with liquid being effected by the application of a passivating bichromate solution.

3. The method defined in claim 2 wherein the copper or copper alloy body is electrodeposited over a period ranging from hours to days with a bath voltage commencing at a fraction of a volt and increased stepwise to one volt to several volts.

* * * * *